US006826603B1

(12) United States Patent
Giroir et al.

(10) Patent No.: US 6,826,603 B1
(45) Date of Patent: Nov. 30, 2004

(54) METHOD AND SYSTEM FOR AUTOMATICALLY CONFIGURING TELNET 3270 CLIENTS IN AN INTERNET PROTOCOL NETWORK

(75) Inventors: Didier Giroir, Cagnes-sur-Mer (FR); Olivier Hericourt, Cagnes-sur-Mer (FR)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 09/605,003

(22) Filed: Jun. 27, 2000

(30) Foreign Application Priority Data

Jul. 1, 1999 (EP) ............................................. 99480053

(51) Int. Cl.⁷ .......................................... G06F 15/177
(52) U.S. Cl. ..................................... 709/220; 709/203
(58) Field of Search ................................ 709/203, 220

(56) References Cited

U.S. PATENT DOCUMENTS

| | | | | |
|---|---|---|---|---|
| 5,931,913 A | * | 8/1999 | Meriwether et al. | 709/227 |
| 6,067,623 A | * | 5/2000 | Blakley et al. | 713/201 |
| 6,076,110 A | * | 6/2000 | Murphy et al. | 709/228 |
| 6,128,738 A | * | 10/2000 | Doyle et al. | 713/185 |
| 6,192,411 B1 | * | 2/2001 | Chan et al. | 709/232 |
| 6,233,542 B1 | * | 5/2001 | Butts et al. | 703/27 |
| 6,353,608 B1 | * | 3/2002 | Cullers et al. | 370/352 |
| 6,381,654 B1 | * | 4/2002 | Brawn et al. | 709/331 |
| 6,430,595 B1 | * | 8/2002 | Ferguson et al. | 709/220 |

* cited by examiner

Primary Examiner—Mehmet B. Geckil
(74) Attorney, Agent, or Firm—Winstead Sechrest & Minick P.C.

(57) ABSTRACT

The present invention relates to dynamic Client configuration and more particularly to a system and a method for automatically configuring a Client to access each desired SNA Application through an appropriate Server. A configuration feature (also called Automatic Server Configuration option) in a Client automatically retrieves a configuration code (also called Autoserver code, in order to configure the Client to access desired SNA Applications through appropriate Servers. A CGI (Common Gateway Interface, program on an Autoserver URL (Universal Resource Locator) system dynamically creates an Autoserver code (also called TN client configuration code). The Autoserver code is used by the Client to associate to each desired SNA Application an appropriate Server. The automatic configuration of the Client allows the user to directly access an SNA Application without having first to connect to an Intermediate Selection Application and Selection Screen.

67 Claims, 7 Drawing Sheets

Data Flow Associated with the Automatic Configuration of a TN 3270 Client

METHOD AND SYSTEM FOR AUTOMATICALLY CONFIGURING TELNET 3270 CLIENTS IN AN INTERNET PROTOCOL NETWORK

TECHNICAL FIELD OF THE INVENTION

The present invention relates to computer networks, and more particularly to a method and system in an Internet Protocol (IP) network for automatically configuring a Telecommunications Network ("Telnet") 3270 client to access a desired Systems Network Architecture (SNA) application among a plurality of possible SNA applications through an appropriate Telnet 3270 client.

BACKGROUND

SNA and IP Environment

Every day, for all sorts of reasons, more and more companies are focusing on the consolidation of the multiple specialized networks they directly operate or lease from service providers onto a single protocol network. These multiple specialized networks are based on diverse networking technologies such as Systems Network Architecture (SNA), Internet Protocol (IP) or Internetwork Packet Exchange (IPX).

These companies are making this consolidation one of their top priorities. Companies are almost exclusively selecting the Internet Protocol (IP) as their protocol of choice. However, for the overwhelming majority of these companies using SNA protocols and applications, there still is and will be for the many years to come, a major requirement in this changing environment. The requirement is for the employees of these companies to keep the capability they always had to access the huge amount of existing corporate data residing in traditional mainframes and accessible through SNA applications.

TCP/IP

The Internet is a global network of computers and computers networks. The Internet connects computers that use a variety of different operating systems and languages, including UNIX, DOS, Windows, Macintosh, and others. To permit communication among these various systems and languages, the Internet uses a standard language referred to as TCP/IP ("Transmission Control Protocol/Internet Protocol"). The TCP/IP protocol supports three basic applications on the Internet: transmitting and receiving electronic mail, logging into remote computers ("Telecommunications Network" or "Telnet"), and transferring files and programs from one computer to another ("FTP" or "File Transfer Protocol").

World Wide Web

With the increasing size and complexity of the Internet, tools, often called navigators or navigation systems, have been developed to help find information on the network. Navigation systems that have been developed include programs such as Archie, Gopher and WAIS. The World Wide Web ("WWW" or "the Web") is a recent superior navigation system. The Web is:

an Internet-based navigation system, an information distribution and management system, and a dynamic format for communication.

The Web seamlessly integrates several forms of information, including still images, text, audio and video. A user on the Web using a Graphical User Interface("GUI", pronounced "gooey") may transparently communicate with different host computers on the Internet different system applications (including FTP and Telnet), and different information formats for files and documents including, for example, text, sound and graphics.

Hypermedia

The Web uses hypertext and hypermedia. Hypertext is a subset of hypermedia and refers to computer-based "links" through which uses move from one place to another in a document, or to another document, in a non-linear manner. To accomplish this feature, the Web uses a client-server architecture. The user's computer is said to be a client computer to the Web server computer. Web servers enable a user to access hypertext and hypermedia. The clients send requests to the Web servers, which in turn react, search and respond. The Web allows client-based application softwares to request and receive hypermedia documents (including formatted text, audio, video and graphics) from a Web file server with hypertext link capabilities to other hypermedia documents.

The Web, then, can be viewed as a collection of document files residing on Web host computers that are interconnected by hyperlinks using networking protocols, forming a virtual"web" that spans the Internet.

Uniform Resource Locators

A resource on the Internet may be unambiguously identified by a Uniform Resource Locator (URL), which is a pointer to a particular resource at a particular location. A URL specifies the protocol used to access a server (e.g. http://, ftp://, etc.), the name of the server (e.g. www.ibm.com, and the location of a file on that server (e.g. /products/catalog.html).

Hyper Text Transfer Protocol (HTTP)

Each Web page may appear as a complex document that integrates many media, for example, text, images, sounds and animation. Each such page may also contain hyperlinks to other Web documents, so that a user at a client computer may click on icons using a mouse and may activate hyperlink jumps to a new page (which is a graphical representation of another document file) on the same or a different Web server.

A Web Server is a software program run on a Web host computer that responds to requests from Web Clients, typically over the Internet. All Web servers use a language or protocol to communicate with Web Clients which is called HyperText Transfer Protocol ("HTTP") graphics, sound and video. All types of data, including HyperText Markup Language ("HTML"), can be exchanged among Web servers and clients using this protocol. HTML describes the layout, contents and hyperlinks of the documents and pages to be displayed to the user. When browsing, Web Clients convert user-specified commands into HTTP GET requests, connect to the appropriate Web Server to obtain the information, and await a response. The response from the server may be the requested document or an error message. After a document or an error message is returned, the connection between the Web client and the Web server is closed.

The first version of HTTP is a stateless protocol. That is to say, with HTTP version 1.0, there are no continuous connections between clients and servers. A Web client using HTTP receives a response as HTML data or other data. Newer versions of HTTP break this barrier of a stateless protocol by keeping the connection between the server and client alive under certain conditions.

Browser

After receipt, the Web Client formats and presents the data or activates an ancillary application, such as a sound player, to present the data. To do this, the server or the client first determines the type of data to be received. The Web Client is also referred to as the "Web Browser," since it in fact browses documents retrieved from the Web Servers.

Telnet 3270

A widely used technique for the transport of SNA information across an IP network is the use of Telnet technologies, specifically the Telnet3270 ("TN3270") emulation. This technique for SNA "green screen" workstation users utilizes a Client/Server approach. "Host-On Demand" from IBM or "Web client" from CISCO are examples of Client software implementations. Network Utility from IBM or CISCO router's offerings are typical server implementations (hardware and software). The "TN3270 Client" software usually runs within the customer's workstation while the"TN3270 Server" software is usually placed in front of the customer's data center mainframes (or sometimes directly within the mainframe itself) or within the customer's branch offices.

As illustrated in FIG. 1, IP protocols are used between the TN3270 Server 102 and the TN3270 Clients 101, while traditional SNA protocols are used between the TN3270 Server 102 and the target SNA applications 103. More information concerning Telnet, TN3270 and Network Utility can be found in the following publications, incorporated herewith by reference:

"TCP/IP Tutorial and Technical Overview," Martin W. Murhammer, Orcun Atakan, Stefan Bretz, Larry R. Pugh, Kazunari Suzuki, David H. Wood, IBM International Technical Support Organization, October 1998, GG24-3376-05.

"IBM 2216/Network Utility Host Channel Connection," Erol Lengerli, Jacinta Carbonell, Thomas Grueter; IBM International Technical Support Organization, January 1999, SG24-5303-00.

"IBM Network Utility Description and Configuration Scenarios," Tim Kearby, Peter Gayek, Gallus Schlegel, Imre Szabo, Zhi-Yong Zhang; IBM International Technical Support Organization, January 1999, SG24-5289-00.

"Internetworking with TCP/IP-Volume I-Principles, Protocols, and Architecture," Douglas E. Comer, Second Edition, Prentice Hall 1991.

Requests For Comments (RFCs) from the Internet Engineering Task Force (IETF):
RFC 1576: TN3270 Current Practices,
RFC 1646: TN3270 Extensions for LU name and Printer Selection,
RFC 1647: TN3270 Enhancements, and
RFC 2355: TN3270 Enhancements.

Accessing SNA Applications via Traditional SNA End-to-End

In the traditional SNA world, user workstations traditionally obtain access to SNA applications by connecting first to an intermediate application. This intermediate application provides for access to the real target application. This intermediate application, also referred to as an Intermediate Selection Application, usually displays to the user a selection screen which lists the SNA applications that may be accessed. The user selects from that menu the target SNA application he wants to access and is then connected to that target SNA application, which usually presents to the user an application welcome screen (for instance displaying the SNA application name and asking for a user logon and password). FIG. 2 describes a traditional SNA access to an Intermediate Selection Application in an SNA environment.

First step 201: The user is presented a Selection Screen of a plurality of possible applications by the Intermediate Selection Application (three possible applications A, B and C). Usually, the workstation automatically sets up a direct connection to the Intermediate Selection Application, as soon as the workstation's SNA protocol stack is started (or, in case of a "dumb" terminal, when the terminal is powered on). Second step 202: Provided that at this time the Intermediate Selection Application is up and running, the connected user selects an application (application A) by typing an application name on the selection screen. Third step 203: Finally, the user is connected to the desired application (application A), which usually presents to the user an application welcome screen.

Accessing SNA Application from TN3270 Client with Manual Configuration

TN3270 clients can be manually configured with the IP address or name of the TN3270 Server to be accessed in order to reach the target SNA application. The main drawback is that the TN3270 Server selection is static and has to be manually changed for each SNA Application the user wants to access. This situation seriously complicates the administration of networks comprising a plurality of user workstations. Furthermore, since the configuration is manual on each TN3270 Client, there is no way to easily control the TN3270 Servers' load (manual configuration may, for instance, result in some under-used TN3270 Servers, while at the same time other TN3270 Servers may be overused).

Accessing SNA Application from TN3270 Client with Dynamic Configuration

In a TN3270 Client-Server approach, one technique commonly applied is to provide the Intermediate Selection Application via a Web Server implementation. In such a case, the user accesses the Intermediate Selection Application within the Web Server, using his favorite Web Browser running on his user workstation. This approach is described in FIG. 3: First step 301: The user receives a Selection Screen on the Web Browser from the Intermediate Selection Application in the Web Server. The selection screen may offer three applications: A, B and C. By selecting the desired SNA Application from the Selection Screen (just a click from within the Browser), the workstation obtains the IP addressing/naming information corresponding to the preferred TN3270 Server for the desired target SNA application. Second step 302: If the user chooses application C from the Selection Screen, the user workstation obtains from the Web Server the address (SS) for the TN3270 Server(s) (providing access to the mainframe-housed application C). Third step 303: Thus, the local TN3270 Client can be started either manually or automatically to access the preferred Telnet server by using the address provided by the Intermediate Selection Application. The user workstation receives back the address of the Telnet server (Server S whose address is SS) and connects to the target application C via the appropriate server (Telnet Server S). The target application C then presents an Application Welcome Screen to the user (for instance, displaying the SNA application name X and asking for a user login and password).

Going through an Intermediate Selection Application shields end-users from changes that inevitably occur, for example when an SNA application is changed from being run on one server to another server in a different location or when a new SNA application is added. In such cases, only the Selection Screen is modified and changes in target application locations are completely transparent to the users. The workstations' configurations are not impacted by changes in target application locations.

The draw back of this solution is that the end user must first manually connect to a Web Server in order to get the Selection Screen before launching the TN3270 Client. This "menu driven" approach forces the user to go through the Selection Screen before accessing the target SNA Application. Moreover, some form of workstation customization is usually required in order to launch the TN3270 Client from the Web Browser (for instance, setup of Java applets or association of the Web Browser application with the TN3270 Client).

CROP Problem

The problem is to provide a system and method for automatically configuring a TN3270 Client to access a desired SNA Application. Current solutions address this problem only partially. TN3270 Clients can be manually configured with the target TN3270 Server. The main drawbacks of this solution are as follows:

(a) there is no dynamic TN3270 Server selection;

(b) when the TN3270 Server fails, a manual reconfiguration of the TN3270 Client is required; and (c) TN3270 Server names must be known and manually configured by end users, for each SNA Application the user wants to access.

TN3270 Clients can also be dynamically configured to use the TN3270 Server corresponding to the desired SNA Application, using an Intermediate Selection Application running on a dedicated Web Server. The main drawbacks of this solution are as follows:

(a) The connection with the SNA Application is indirect, since the end user must first manually connect to a Web Server to receive the Selection Screen;

(b) Connection to the Web Server must be done each time the end user wants to access an SNA Application;

(c) Some form of workstation customization is usually required in order to launch the TN3270 Client from the Web Browser (for instance setup of Java applets or association of the Web Browser application with the TN3270 Client);

(d) The Web Server running the Intermediate Selection Application may be unreachable, unavailable or too busy to process the application selection. As there is no local copy of the Intermediate Selection Application in the Web Browser, any problem on the Intermediate Selection Application may result in a service interruption (unless the Intermediate Selection Application is locally saved within the user's workstation);

(e) The network maybe slow, leading to unacceptable response time for the user to access the Web-based Intermediate Selection Application in order to select the target application at the time the user needs to connect (unless the Intermediate Selection Application is locally saved within the user's workstation);

(f) The user may be connected by modem to the network and due to bandwidth constraints, may prefer not to add the download time associated with an Intermediate Selection Application phase (unless the Intermediate Selection Application is locally saved within the user's workstation); and (g) Some companies do not wish to install Web Browsers on every user workstation due to the administrative burdens. Further, some companies do not wish to give all of their employees access to the public Internet or to the company intranet.

SUMMARY OF THE INVENTION

The present invention relates to dynamic TN3270 Client configuration and, more particularly, to a system and a method for automatically configuring a TN3270 Client to access each desired SNA application through an appropriate TN3270 Server. The present invention also relates to a configuration feature (also called an Automatic Server Configuration option) in a TN3270 Client designed to automatically retrieve a configuration code (called an Autoserver code) in order to configure the TN3270 Client to access desired SNA applications through appropriate TN3270 Servers. The present invention uses a CGI (Common Gateway Interface) program on an Autoserver URL (Universal Resource Locator) system for dynamically creating an Autoserver code (preferably in Javascript language). The Autoserver code is used by the TN3270 Client to associate an appropriate TN3270 Server with each desired SNA application.

The present invention addresses the drawbacks of the existing solutions by providing a system and a method for automatically configuring a TN3270 Client to access desired SNA applications. The automatic configuration of the TN3270 Client allows the user to directly access an SNA application without having first to connect to an Intermediate Selection Application and Selection Screen. The present invention also provides the following advantages:

(a) The user connects to the SNA application in a single operation. The Selection Screen is eliminated and, therefore, the end user does not go through a manual connection to an Intermediate Selection Application.

(b) The TN3270 Client is configured manually only once with the address of the Autoserver URL system. With the Automatic Server Configuration option, there is no need to reconfigure the TN3270 Client each time the user wants to access a different SNA application, or each time there is a change in the location of either the SNA application or the TN3270 Server.

(c) The TN3270 Server names do not have to be known or manually configured by end users. A backup TN3270 Server can automatically be defined in the TN3270 Client configuration.

(d) Centralized control may be exercised by a System Administrator of the designated TN3270 Servers, since the TN3270 Server selection is automated. This fact enables a control of the TN3270 Servers loads, since alternate TN3270 Servers can be designated by the System Administrator when additional users require access to the same SNA Application.

(e) The Autoserver code can be periodically and dynamically updated in the Autoserver URL system and in the TN3270 Client.

(f) Since there is no need for an Intermediate Selection Application system, the access to an SNA application is not slowed down by such an Intermediate Selection Application system being unavailable or overloaded.

The TN3270 Client need connect only once (when it is launched) to the Autoserver URL (Uniform Resource Locator) system in order to receive the Autoserver code. The TN3270 Client can use a local copy of the Autoserver code if the Autoserver URL system cannot be reached. This saved information can be preserved even when the user's workstation is powered off and on again.

The manual configuration of the TN3270 Client with the Automatic Server Configuration option is simplified. The only required information is the URL (Universal Resource Locator) of the Autoserver system. A Web Browser is not required on the user workstation. Only the TN3270 Client is required. There is no workstation customization required for launching the TN3270 Client from a Web Browser, since the Web Browser is no longer required.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The invention itself, however, as well as a preferred mode of use, further objects, and advantages thereof, will best be understood by reference to the following detailed description of an illustrative detailed embodiment when read in conjunction with the accompanying drawings, wherein.

DETAILED DESCRIPTION OF THE INVENTION

SNA and IP Environments
Extension of Networks

To remain competitive, network users are extending their traditional internal SNA and IP networks outward to business partners, dealers, suppliers, and customers. In this expanding environment, users are also searching for ways to save money and provide connectivity between their mix of SNA and TCP/IP server applications and their TCP/IP and SNA desktop client population.
Consolidation of Networks Many companies today are considering the consolidation of their WAN traffic onto a single IP-only backbone. At the same time, other companies are simplifying their workstation configurations and attempting to run only the TCP/IP protocol stack at the desktop. However, most of these companies still require access to SNA applications hosts.
Telnet 3270

Telnet 3270 meets these requirements by allowing the end user to run IP from the desktop over the network and attach to his SNA host through a TN3270 server. The clients connect to the server using a TCP connection. The server provides a gateway function for the downstream TN3270 clients by mapping the client sessions to SNA-dependent Logical Unit to Logical Unit ("LU-LU") sessions that the server maintains with the SNA host. The TN3270 server handles the conversion between the TN3270 data stream and an SNA 3270 data stream. As mentioned above, the path from a TN3270 client to the SNA host consists of:

1. A TCP connection over IP from the client to the server; and
2. An SNA LU-LU session from the server to the host.

Connecting to a host for establishing a LU-LU session can be accomplished using a traditional sub-area connection or using an APPN connection.

To deploy a TN3270 solution, TN3270 client software is installed on desktop workstations and TN3270 server software is installed in one of several places discussed below. Client software is available from IBM and many other vendors which runs on top of the TCP/IP stack in the work station. A given client product may provide one of two possible levels of standard support:

1) Base TN3270 client; or These clients conform to RFC 1576 (TN3270 Current Practices) and/or RFC 1646 (TN3270 Extensions for LU name and Printer Selection).

2) TN3270E client.

These clients conform to RFC 1647 (TN3270 Enhancements), and 20RFC 2355 (TN3270 Enhancements).

Figure 1:
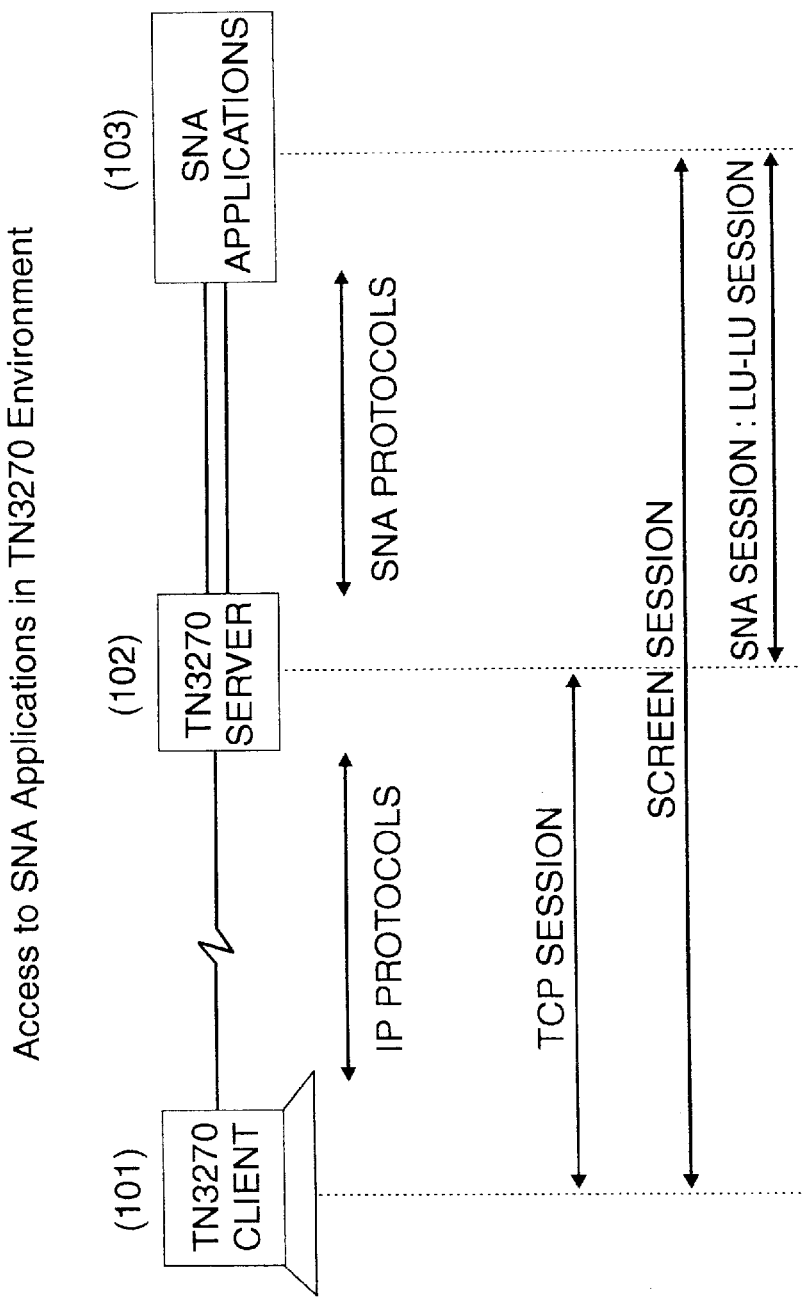
FIG. 1 is a general view of a client accessing SNA applications in a TN3270 environment, according to the prior art.
Figure 2:
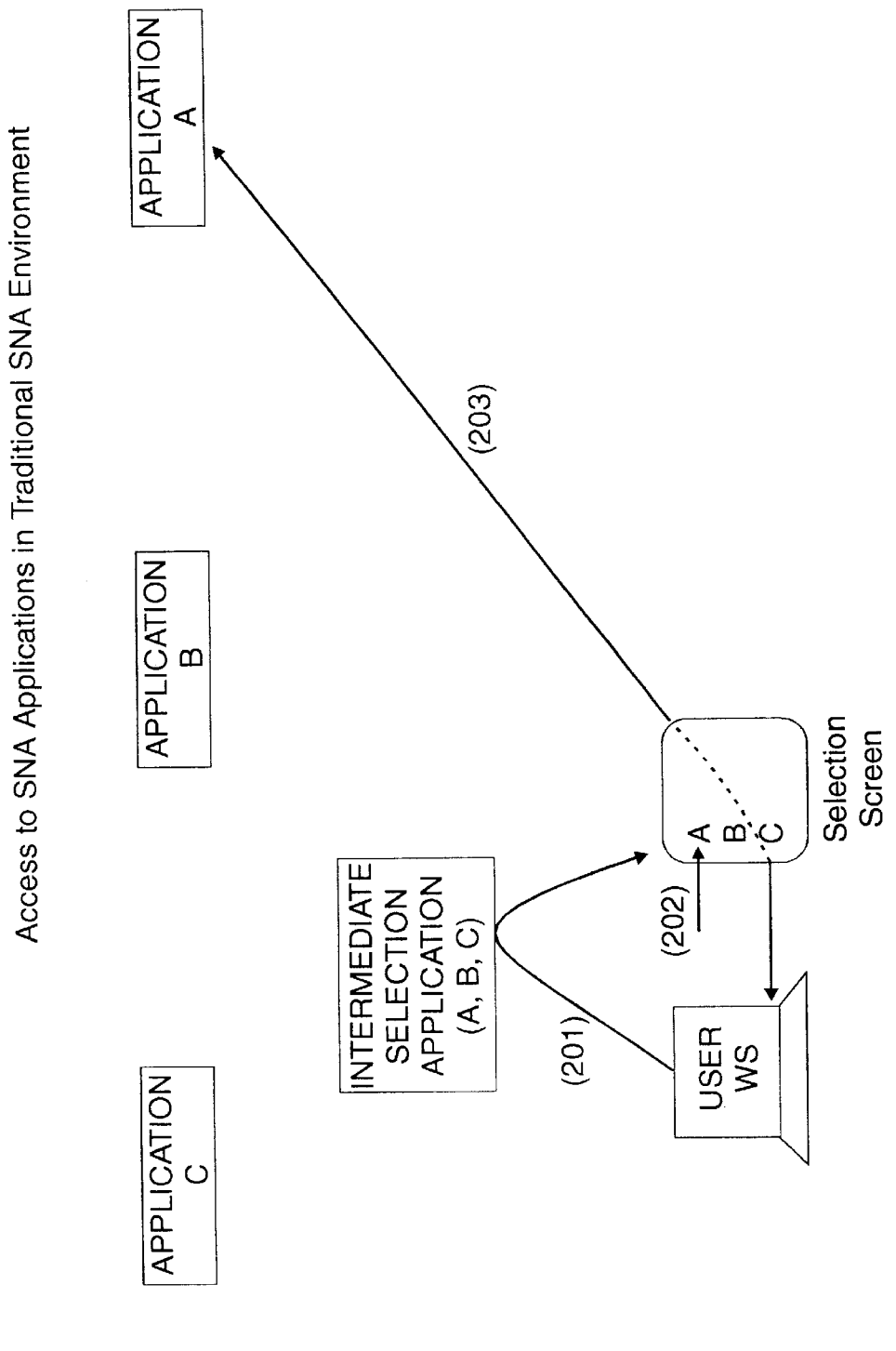
FIG. 2 is a view of a system for accessing SNA applications via an Intermediate Selection Application in a traditional SNA environment, according to the prior art.
Figure 3:
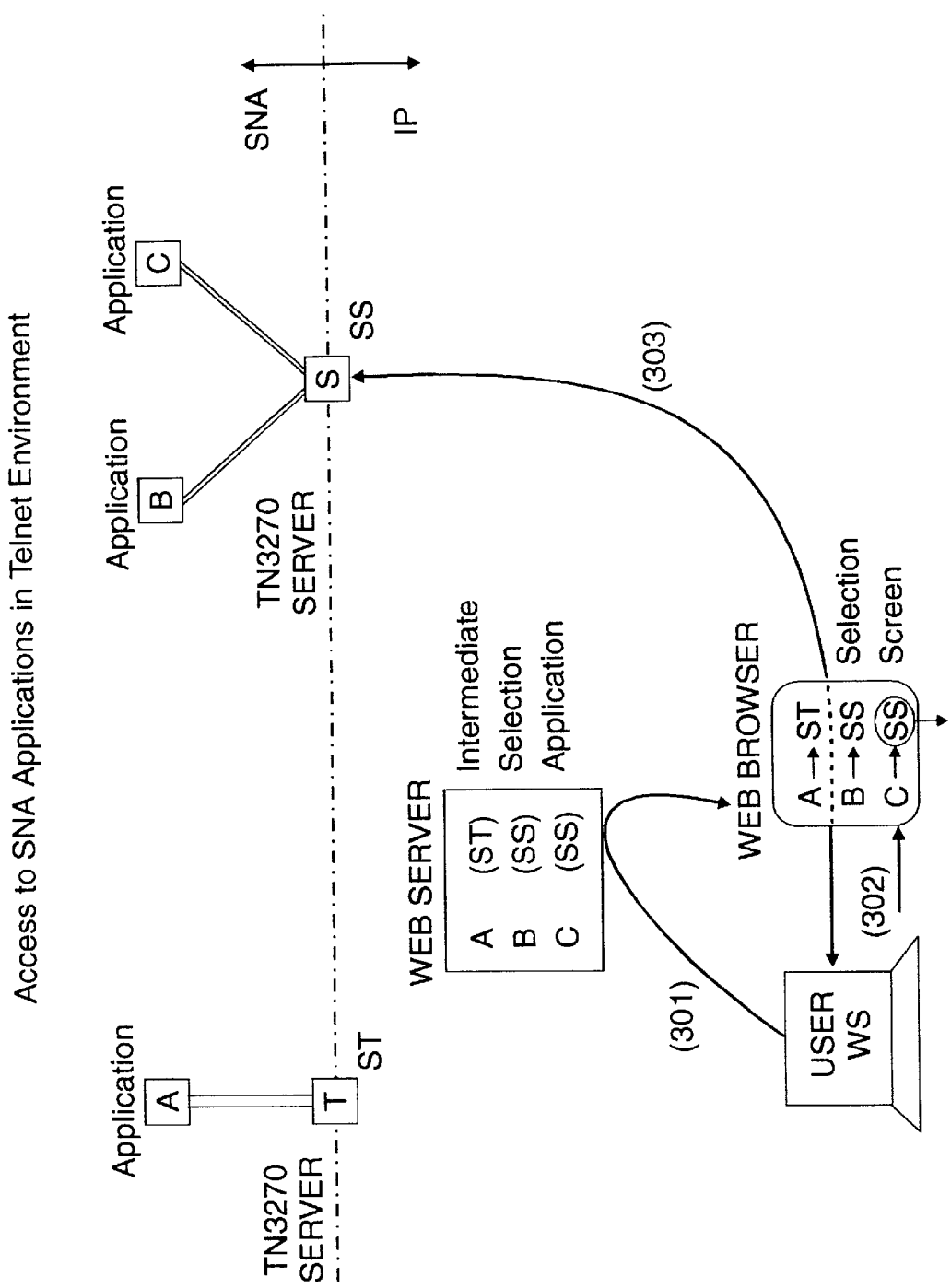
FIG. 3 is a view of a system for accessing SNA applications via an Intermediate Selection Application in a TN3270 environment, according to the prior art.
Figure 4:
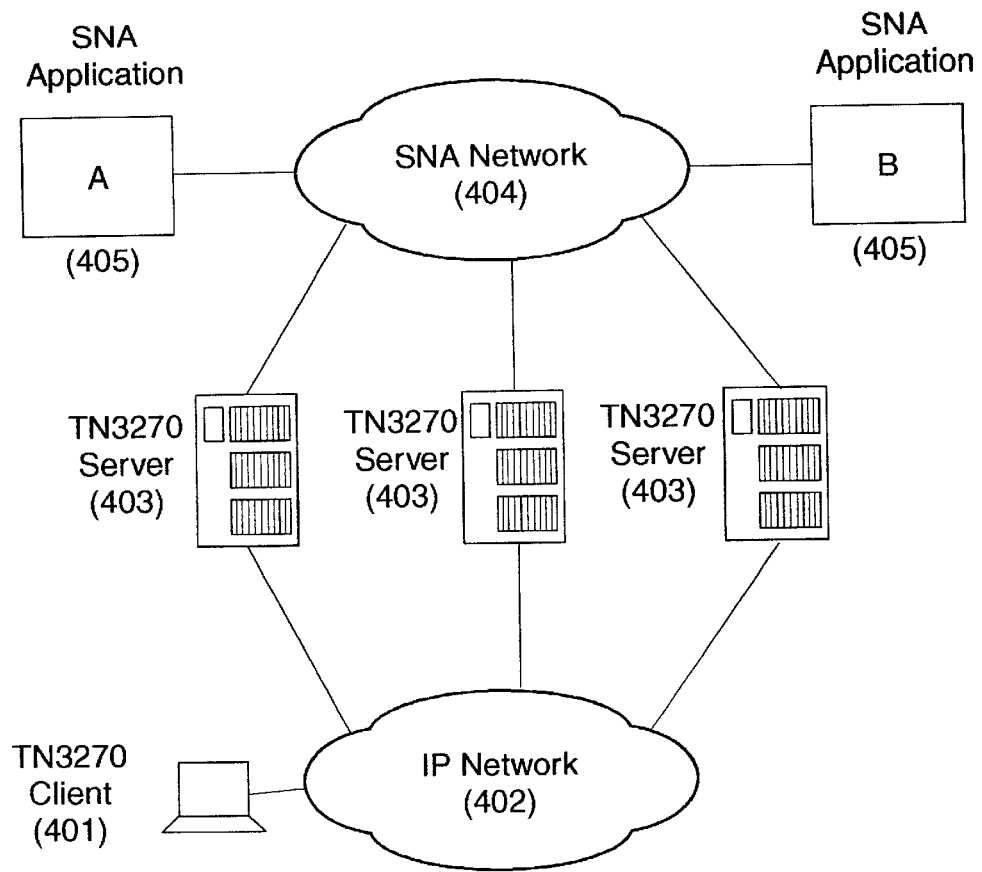
FIG. 4 is a view of the TN3270 environment, according to the prior art.

A server implementation that can support TN3270 E clients is called TN3270 E server. The TN3270 server function can be placed in a variety of products and positions within a network, including in the SNA host itself; in a router in front of the data host or within the network or in a specialized box within the network.
Access of SNA Applications via Telnet 3270 Servers FIG. 4 shows an end user workstation 401 accessing SNA Applications 405 via TN3270 Servers 403. The end user workstation 401 hosts a web Browser and a TN3270 Client and is connected to the IP network 402. The TN3270 Servers 403 attach both the IP network 402 and the SNA Network 404. They act as intermediaries or interfaces for the communications between these two networks. The systems hosting the destination SNA Applications 405 also connects to the SNA Network. Multiple TN3270 Servers can be used to access the same SNA Application in order to provide some degree of access robustness and load balancing.
Automatic Configuration of TN3270 Clients The environment where the invention is used is described in FIG. 5, where an end user within a IP Network wants to access SNA Applications using a TN3270 Client, and where the SNA Applications can be reached through one or several TN3270 servers. The problem is to automatically configure the TN3270 Client to access the SNA Application the user wants to reach through the appropriate TN3270.

The TN3270 Client 501 is attached to the TCP/IP Network 502, while the SNA Application 505 is attached to the SNA Network 504. The TN3270 Client 501 is configured with an Automatic Server Configuration option, and the URL (Universal Resource Locator) of a system called Autoserver URL system 506 is provided as a configuration parameter.

When it is started, the TN3270 Client 501 automatically connects 509 to the Autoserver URL system 506. The Autoserver URL system uses a CGI (Common Gateway Interface) 507 program to dynamically generate 510 an Autoserver code 508 (which may be Javascript code in an alternate embodiment). This Autoserver code contains the list of all the SNA Applications that can be accessed by the end user with the designated TN3270 Servers. The Autoserver code is downloaded to the TN3270 Client 511 when the TN3270 Client connects to the Autoserver URL system. The user can then access 512 the target SNA Application.

The TN3270 Client connection to the Autoserver URL system, and the download of the Autoserver code to the TN3270 Client can for instance be done using HTTP protocol. In this case, the Autoserver URL system can be a Web Server. If the TN3270 Client cannot reach the Autoserver URL system, the TN3270 Client can use a local copy of the Autoserver code which was saved at a previous connection.

Optionally, the Autoserver code may provide backup TN3270 Servers jointy with the designated ones, so that the TN3270 Client can still access an SNA Application even if the associated designated TN3270 Server has failed or cannot be accessed.

Optionally, the Autoserver code may also provide a default TN3270 Server, to be used by the TN3270 Client to access SNA Applications which are not explicitly listed in the Autoserver code.

Optionally the TN3270 Client may also be updated with a new selection of TN3270 Servers each time an SNA Application is accessed. Further, the TN3270 Client can be periodically and dynamically updated using a "refresh" tag in the Autoserver code, or external code(or Java applet). The instant invention may also use a feature in the TN3270 Client for periodically and automatically refreshing the Autoserver code.

An advantage of the instant invention is the minimization of the useless traffic to a failing TN3270 Server. Certain TN3270 Servers can be excluded from the list of available TN3270 Servers in the Autoserver code upon failure detection. Another advantage of the invention is that a backup TN3270 Server can be provided to the TN3270 Client with no manual re-configuration of the TN3270 Server, so that the user can still access the SNA Application even if the designated TN3270 Server fails. TN3270 Server names and locations do not need to be known or configured by the end user, thus providing a seamless service which is advantageous for mobile users.

Figure 5:
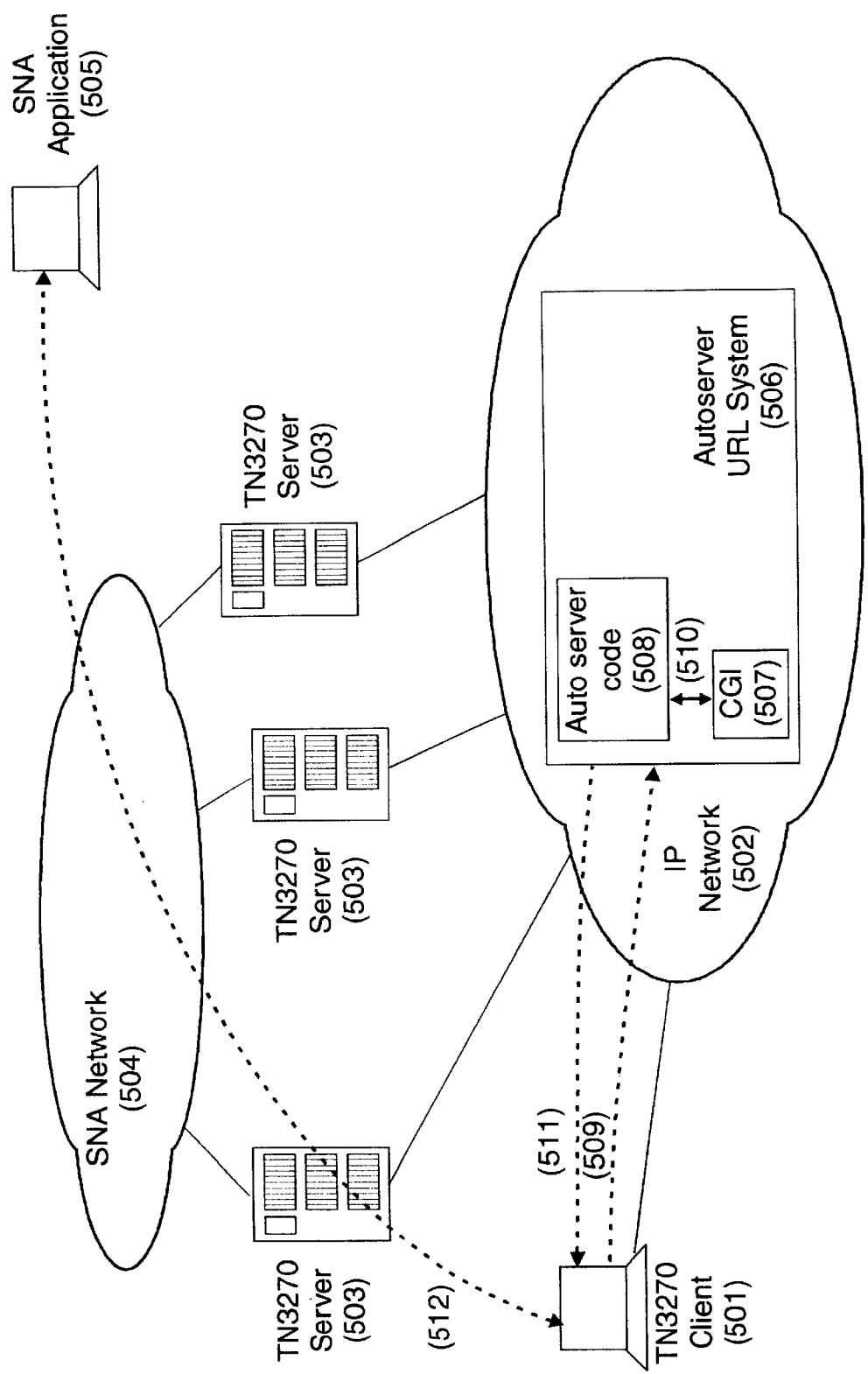
FIG. 5 is a view of the dataflow associated with the automatic configuration of the TN3270 Client according to the present invention.
Figure 6:
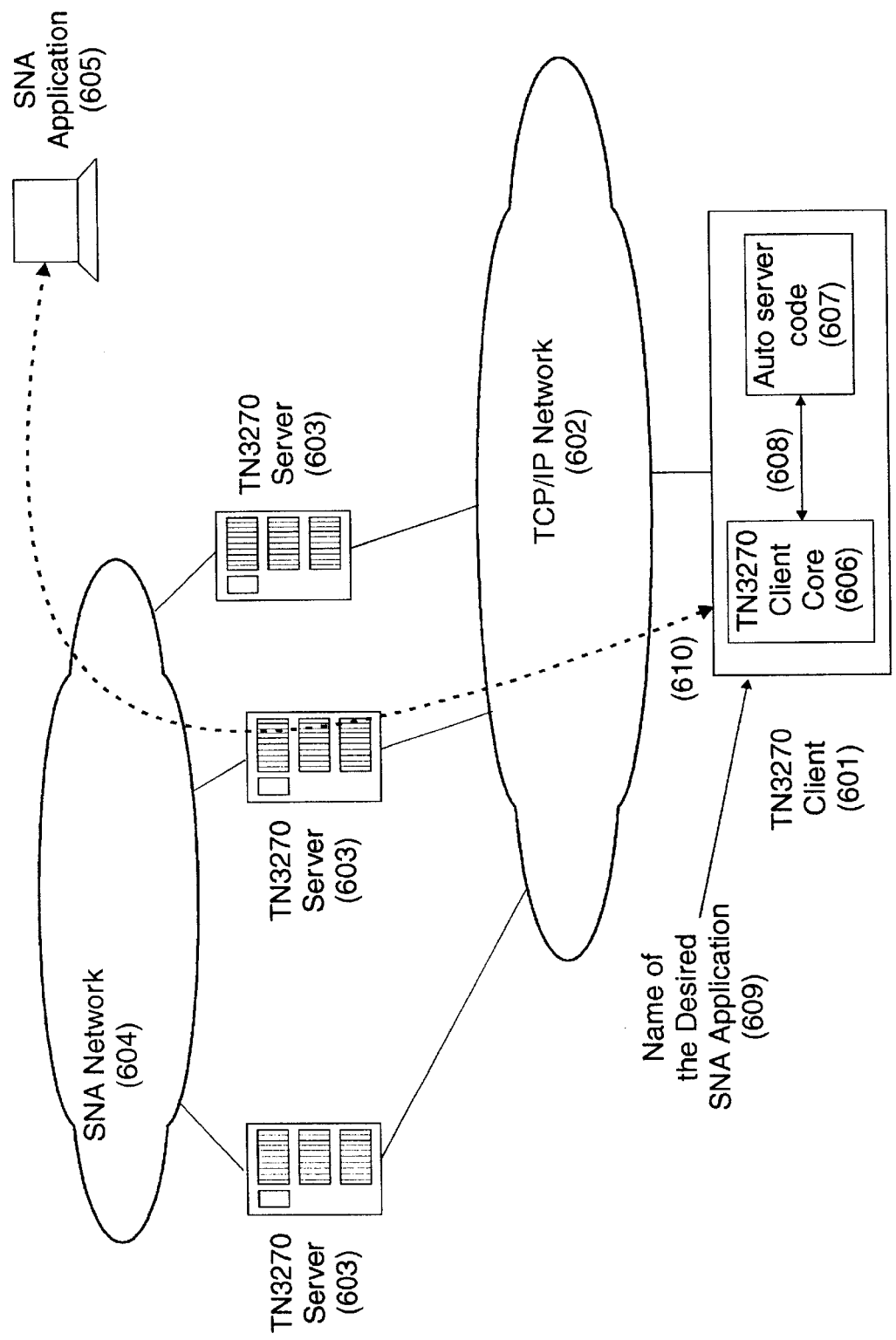
FIG. 6 describes the process of accessing a desired SNA application from a TN3270 Client with an Automatic Server Configuration option according to the present invention.

Access to a Desired SNA Application by an End User From a TN3270 Client With Automatic Server Configuration Option FIG. 6, in conjunction with FIG. 5, describes the method and system for connecting an end user to a desired SNA Application. Again, the TN3270 Client 601 attached to the IP Network 602 is configured with the Automatic Server Configuration option to retrieved the Autoserver code from the Autoserver URL system. The Autoserver code determines the TN3270 Server 603 that must be used to access the desired SNA Application 605 within the SNA network 604. The Autoserver code (preferably in Javascript) is downloaded to the TN3270 Client as shown in FIG. 5.

The TN3270 Client 601 program comprises a TN3270 Client Core component 606, which uses 608 the Autoserver code 607 in order to configure the TN3270 Client to use the appropriate TN3270 Server for accessing the desired SNA Application. When the end user wants to access one or multiple SNA Applications, he first starts his TN3270 Client 601. The end user then enters 609 the name of the SNA Application he wants to access, using for instance a "Desired SNA Application" input window in the TN3270 Client screen. Inside the TN3270 Client, the TN3270 Client Core component 606 then reads 608 the Autoserver code 607 in order to find the TN3270 Server which is designated to access the desired SNA Application.

The TN3270 Client Core component then automatically configures the TN3270 Client to connect to that designated TN3270 Server.

The connection to the SNA Application via that TN3270 Server is then established 610. The end user is now in session with the desired SNA Application. Possibly, the TN3270 Client can present to the user the list of SNA Applications that is contained in the Autoserver code. This way, the end user may not have to explicitly enter the SNA Application name, but instead may select one application from a list locally displayed by his TN3270 Client.

Once the end user has terminated the connection with the target SNA Application, there is no need to close the TN3270 Client and to restart it when the end user wants to connect to another SNA Application, nor to reconnect to the Autoserver URL system. The end user only has to enter into his TN3270 Client the name of the other SNA Application he now wants to access, and the same mechanism as depicted above applies. The Automatic Server Configuration option of the TN3270 Client allows the user to directly connect to the SNA Application without having first to connect to an Intermediate Selection Application and a Selection Screen. The manual TN3270 Client configuration with the Automatic Server Configuration option is done only once and the only required configuration information is the URL of the Autoserver system. There is no need to reconfigure the TN3270 Client each time the user wants to access a different SNA Application.

Another advantage of the invention is that the Autoserver code is centrally managed, on the Autoserver URL system. This allows a centralized control of the TN3270 Servers accessed by the users by a System Administrator. This feature enables, for instance, a control of the TN3270 Servers' load since different TN3270 Servers can be selected by the System Administrator when different users require access to the same SNA Applications. Since there is no need for an Intermediate Selection Application system, the access to the SNA Application is not slowed down when such a system is not available or when it is overloaded. The TN3270 Client only connects to the Autoserver URL system once—when it is started—in order to receive the Autoserver code, and can use a local copy of that Autoserver code if the Autoserver URL system cannot be reached.

A Web Browser is not required on the user workstation. Only the TN3270 Client with Automatic Server Configuration option is required. There is no workstation customization required in order to start the TN3270 Client from a Web Browser, since a Web Browser is no longer required.

Program Running at Autoserver URL System

Figure 7:
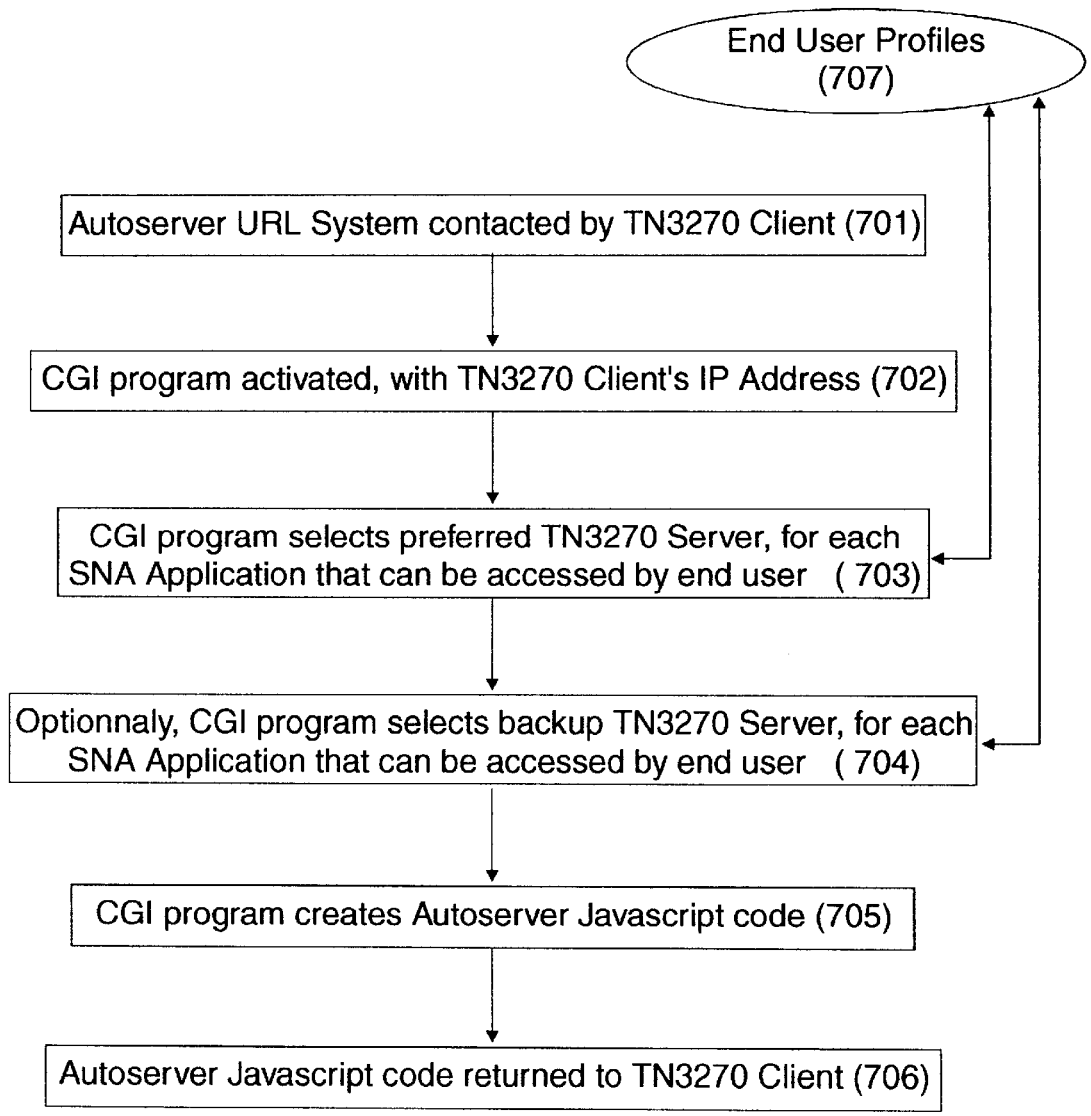
FIG. 7 is a flow chart of the process of the instant invention running on the Autoserver URL (Universal Resource Locator) system.

FIG. 7 is a flow chart of the program running on the Autoserver URL system 701. The Autoserver URL system is contacted by a TN3270 Client to retrieve the Autoserver code 702. The Autoserver URL system activates the CGI (Common Gateway Interface) program (via the CGI extensions). The CGI program has access to all standard CGI variables, including the IP (Internet Protocol) address of the TN3270 Client 703. The CGI program designates the TN3270 Server, providing access to each SNA Application that can be accessed by the end user. This selection is based on both the IP address of the end user TN3270 Client (obtained as a CGI variable) and some information provided by a System to Administrator. The IP address is used to permit a geographical criteria to be used in the TN3270 Server selection. For instance, if two TN3270 Servers provide the same response time (one in the United States, the other one in Europe), the closest TN3270 Server is preferred (the one in Europe if the end user workstation is in Europe). The information provided by the System Administrator is, for instance, a list of different preferred TN3270 Servers that specific user populations should use to access the same SNA Application, in order to have some load sharing across the TN3270 Servers 704. To improve the robustness of the TN3270 Server selection, the CGI program optionally selects a "backup" TN3270 Server for each SNA Application. This "backup" TN3270 Server is automatically used by the TN3270 Client after it times out attempting to use the designated TN3270 Server. Again this "backup" TN3270 Server is selected using both the IP address of the TN3270 Client (obtained as a CGI variable) and the information provided by a System Administrator.

Optionally, the Autoserver code also provides a default TN3270 Server, to be used by the TN3270 Client to access SNA Applications which are not explicitly listed in the Autoserver code. Optionally, the CGI program uses User Profiles 707 located on the Autoserver URL system in order to customize the list of SNA Applications provided in the Autoserver code according to some end user specific information. This is used, for instance, to define what SNA Applications an individual user (or a class of users) is supposed (and enabled) to access 705. Once the CGI program has selected the designated TN3270 Servers, and optionally the "backup" TN3270 Servers, it creates the Autoserver code. In a preferred embodiment, the Autoserver code is in Javascript 706.

Once the Autoserver code has been created, the Autoserver URL system downloads it to the TN3270 Client via, for instance, standard HTTP protocol as any other output of a CGI program.

While the invention has been particularly shown and described with reference to a preferred embodiment, it will be understood that various changes in form and detail may be made therein without departing from the spirit, and scope of the invention.

What is claimed is:

1. A method of configuring a client to access a system networking architecture (SNA) application through a plurality of servers in an Internet Protocol (IP) network, said method comprising the steps of:

retrieving a client configuration code comprising instructions for accessing a selected SNA application through a designated server;

configuring the client with the client configuration code; and accessing the selected SNA application from the client through the appropriate designated server.

2. The method according to claim 1, wherein the client comprises a TN3270 client and the plurality of servers comprise a plurality of TN3270 servers.

3. The method according to claim 1, wherein the client configuration code is retrieved from an autoserver uniform resource locator (URL) system.

4. The method according to claim 3, wherein the client comprises a TN3270 client and the plurality of servers comprise a plurality of TN3270 servers.

5. The method according to claim 1, comprising the additional step of:

initializing the client with the IP address or name of the autoserver uniform resource locator (URL) system.

6. The method according to claim 2, comprising the additional step of:

initializing the client with the IP address or name of the autoserver uniform resource locator (URL) system.

7. The method according to claim 1, comprising the additional step of:

configuring the client with an automatic server configuration option comprising instructions for processing the step of retrieving the client configuration code.

8. The method according to claim 1, wherein the designated server is a default server and, when the default server is in failure, a backup server.

9. The method according to claim 8, wherein the client comprises a TN3270 client and the plurality of servers, the default server, and the backup server comprise a plurality of TN3270 servers.

10. The method according to claim 1, comprising the additional step of repeating beginning at the step of retrieving the client configuration code for each time the client is started.

11. The method of claim 1 further comprising the step of selecting the designated server using a Common Gateway Interface (CGI) program.

12. The method according to claim 3, comprising the additional step of repeating beginning at the step of retrieving the client configuration code for each time the client configuration code is updated in the autoserver URL system.

13. The method according to claim 12, wherein the client comprises a TN3270 client and the plurality of servers comprise a plurality of TN3270 servers.

14. The method according to claim 1, further comprising the step of repeating periodically the step of retrieving the client configuration code.

15. The method according to claim 3, further comprising the step of repeating periodically the step of retrieving the client configuration code.

16. The method according to claim 15, wherein the client comprises a TN3270 client and the plurality of servers comprise a plurality of TN3270 servers.

17. The method according to claim 3, wherein the autoserver URL system is a Web server and said step of retrieving the configuration code is processed using hypertext transfer protocol (HTTP).

18. The method according to claim 1, wherein the client configuration code is in Javascript language.

19. A client comprising:

means to retrieve a client configuration code comprising instructions for accessing a system networking architecture (SNA) through a designated server;

means to configure the client with the client configuration code; and means to access a selected SNA application from the client through the designated server.

20. The client according to claim 19, wherein the client comprises a TN3270 client and the plurality of servers comprise a plurality of TN3270 servers.

21. The client of claim 19, wherein the client configuration code is retrieved from an autoserver uniform resource locator (URL) system.

22. The client of claim 21, wherein the client comprises a TN3270 client and the plurality of servers comprise a plurality of TN3270 servers.

23. The client of claim 21, further comprising means for initializing the client with the IP address or name of the autoserver uniform resource locator (URL) system.

24. The client of claim 20, further comprising means for initializing the client with the IP address or name of the autoserver uniform resource locator (URL) system.

25. The client of claim 19, further comprising means for configuring the client with an automatic server configuration option comprising instructions for processing the step of retrieving the client configuration code.

26. The client of claim 19, wherein the designated server is a default server and, when the default server is in failure, a backup server.

27. The client of claim 26, wherein the client comprises a TN3270 client and the plurality of servers, the default server, and the backup server comprise a plurality of TN3270 servers.

28. The client of claim 19, further comprising means for repeating beginning with the means for retrieving the client configuration code for each time the client is started.

29. The client of claim 21, further comprising means for repeating beginning with the means for retrieving the client configuration code for each time the client configuration code is updated in the autoserver URL system.

30. The client of claim 29, wherein the client comprises a TN3270 client and the plurality of servers comprise a plurality of TN3270 servers.

31. The client of claim 19, further comprising means for repeating periodically the means for retrieving the client configuration code.

32. The client of claim 21, further comprising means for repeating periodically the means for retrieving the client configuration code.

33. The client of claim 15, wherein the client comprises a TN3270 client and the plurality of servers comprise a plurality of TN3270 servers.

34. The client of claim 21, wherein the autoserver URL system is a Web server and said means of retrieving the configuration code is processed using hypertext transfer protocol (HTTP).

35. The client of claim 19, wherein the client configuration code is in Javascript language.

36. The client of claim 19 wherein said client configuration code is generated using a Common Gateway Interface (CGI) program operable for selecting the designated server.

37. A computer readable medium having stored thereon computer-executable instructions for a client to access a system networking architecture (SNA) application through a plurality of servers in an Internet Protocol (IP) network, performing the steps comprising:
   retrieving a client configuration code comprising instructions for accessing a selected SNA application through a designated server;
   configuring the client with the client configuration code; and
   accessing the selected SNA application from the client through the designated server.

38. The computer readable medium according to claim 37, wherein the client comprises a TN3270 client and the plurality of servers comprise a plurality of TN3270 servers.

39. The computer readable medium of claim 37, wherein the client configuration code is retrieved from an autoserver uniform resource locator (URL) system.

40. The computer readable medium of claim 39, wherein the client comprises a TN3270 client and the plurality of servers comprise a plurality of TN3270 servers.

41. The computer readable medium of claim 37, further comprising computer executable codes to perform the additional step of initializing the client with the IP address or name of the autoserver uniform resource locator (URL) system.

42. The computer readable medium of claim 38, further comprising computer executable instructions to perform the additional step of:
   initializing the client with the IP address or name of the autoserver uniform resource locator (URL) system.

43. The computer readable medium-of claim 37, further comprising computer executable instructions for performing the additional step of
   configuring the client with an automatic server configuration option comprising instructions for processing the step of retrieving the client configuration code.

44. The computer readable medium of claim 37, wherein the designated server is a default server and, when the default server is in failure, a backup server.

45. The computer readable medium of claim 44, wherein the client comprises a TN3270 client and the plurality of servers, the default server, and the backup server comprise a plurality of TN3270 servers.

46. The computer readable medium of claim 37, further comprising computer executable instructions for performing the additional step of repeating beginning at the step of retrieving the client configuration code for each time the SNA application is to be accessed.

47. The computer readable medium of claim 39, further comprising computer executable instructions for performing the additional step of repeating beginning at the step of retrieving the client configuration code for each time the client configuration code is updated in the autoserver URL system.

48. The computer readable medium of claim 47, wherein the client comprises a TN3270 client and the plurality of servers comprise a plurality of TN3270 servers.

49. The computer readable medium of claim 37, further comprising computer executable instructions for performing the step of repeating periodically the step of retrieving the client configuration code.

50. The computer readable medium of claim 39, further comprising computer executable instructions for performing the step of repeating periodically the step of retrieving the client configuration code.

51. The computer readable medium of claim 50, wherein the client comprises a TN3270 client and the plurality of servers comprise a plurality of TN3270 servers.

52. The computer readable medium of claim 39, wherein the autoserver URL system is a Web server and said step of retrieving the configuration code is processed using hypertext transfer protocol (HTTP).

53. The computer readable medium of claim 37, wherein the client configuration code is in Javascript language.

54. The computer readable medium of claim 37 further comprising computer executable codes to perform the additional step of selecting the designated server using a Common Gateway Interface (CGI).

55. A method of configuring a client to access one of a plurality of an autoserver uniform resource locator (URL) system and networking architecture (SNA) applications through a plurality of servers, in an internet protocol(IP) network comprising a plurality of servers, said method comprising the steps:
   selecting a designated server selecting for each SNA application that the client desires to access;,
   creating a client configuration code according to; the designated server and
   downloading the client configuration to the client.

56. The method according to claim 55, further comprising the step of dynamically updating the client configuration code according to the selected appropriate servers.

57. The method according to claim 55, wherein the step of creating a client configuration code is processed by a common gateway interface (CGI) on said autoserver uniform resource locator (URL) system.

58. The method according to claim 55, wherein the client comprises a TN3270 client and the plurality of servers comprise a plurality of TN3270 servers.

59. The method according to claim 58, wherein the step of selecting a TN3270 server comprises the step of excluding servers in failure.

60. The method according to claim 55, further comprising the step of selecting a backup server to use when a server is in failure.

61. The method according to claim 55, further comprising the step of selecting a default server for SNA applications not explicitly listed in the client configuration code.

62. The method according to claim 55, wherein the configuration code is downloaded each time the client is started.

63. The method according to claim 55, wherein the configuration code is downloaded on request of the client each time an SNA application has to be accessed.

64. The method according to claim 57, wherein the configuration code is downloaded each time the configuration code is updated in the autoserver uniform resource locator (URL) system.

65. The method according to claim 55, wherein the configuration code is downloaded periodically.

66. The method according to claim 55, wherein the step of selecting a server comprises the further step of selecting the server according to the Internet Protocol (IP) address or name.

67. The method according to claim 57, wherein the autoserver uniform resource locator (URL) system is a Web server and said step of downloading the configuration code is processed using hyper text transfer protocol (HTTP).

* * * * *